United States Patent [19]

Abend et al.

[11] 4,084,659

[45] Apr. 18, 1978

[54] AUTOMOTIVE VEHICLE SPEED CONTROL SYSTEM

[75] Inventors: Karl-Ludwig Abend, Schwieberdingen; Bernhard Mattes, Sachsenheim; Hans Scheyhing, Leonberg, all of Germany

[73] Assignee: Robert Bosch GmbH, Stuttgart, Germany

[21] Appl. No.: 722,210

[22] Filed: Sep. 10, 1976

[30] Foreign Application Priority Data

Oct. 4, 1975 Germany .............................. 2544454

[51] Int. Cl.² ............................................. B60K 31/00
[52] U.S. Cl. .................................. 180/105 E; 123/102
[58] Field of Search ..................... 180/105 E, 105 R; 123/102

[56] References Cited

U.S. PATENT DOCUMENTS

| 3,455,411 | 7/1969 | Carp et al. ..................... 180/105 R |
| 3,485,316 | 12/1969 | Slavin et al. ......................... 123/102 |
| 3,511,329 | 5/1970 | Wisner ................................. 123/102 |

Primary Examiner—Joseph F. Peters, Jr.
Assistant Examiner—Donn McGiehan
Attorney, Agent, or Firm—Flynn & Frishauf

[57] ABSTRACT

To improve the reliability of systems which, upon operation of the brake, must be disconnected but otherwise operate reliably, and to reduce the number of components required, a memory and control circuit is provided which includes an amplifier having a self-holding feedback connection. Upon receiving a "disconnect" signal, for example due to operation of the brake of the vehicle, control operation of the circuit is inhibited; upon operation of a "resume" switch, connected to the feedback junction, the self-holding feature of the amplifier in the "disconnect" mode is inhibited so that the circuit can again resume its control function.

8 Claims, 1 Drawing Figure

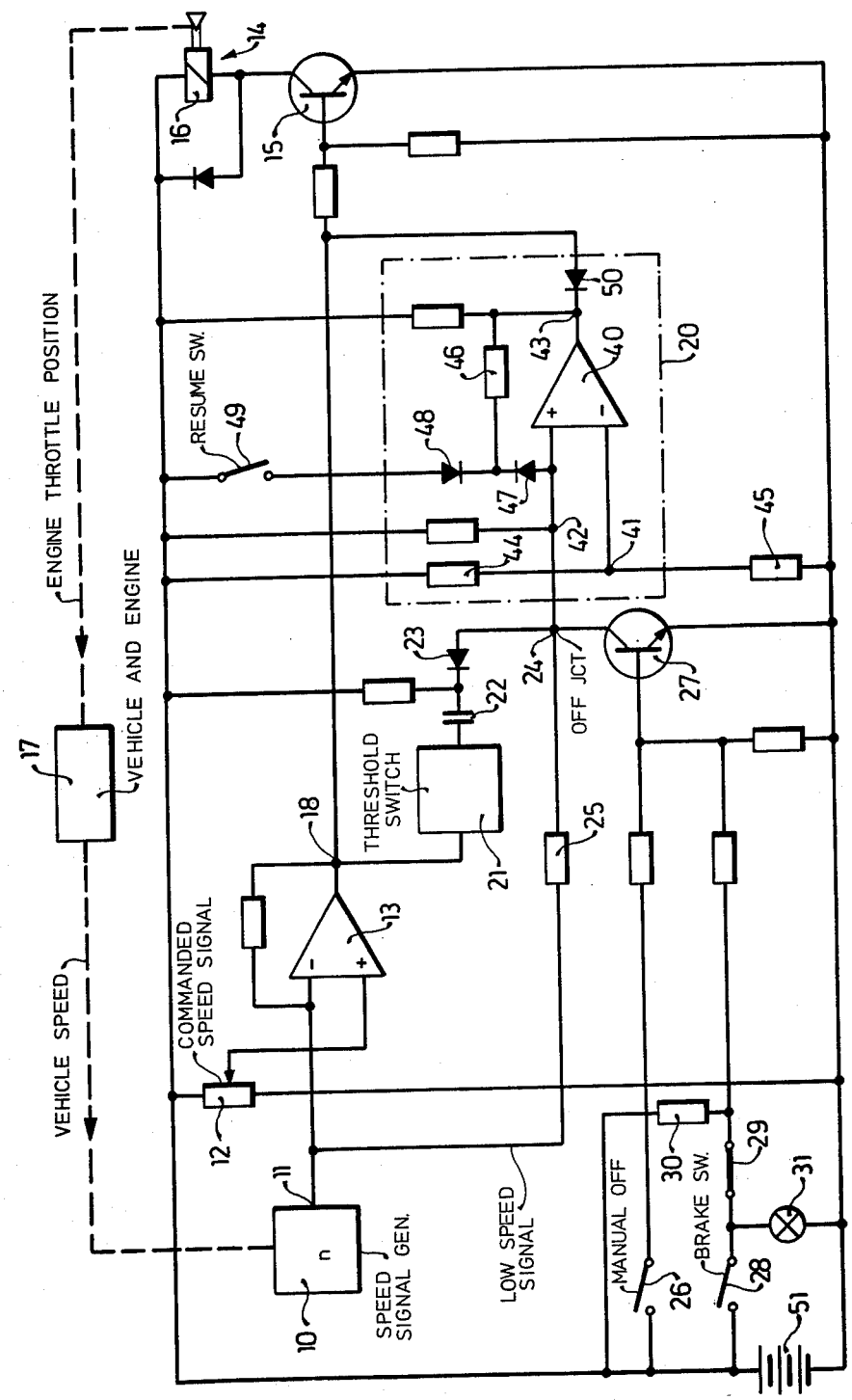

AUTOMOTIVE VEHICLE SPEED CONTROL SYSTEM

CROSS REFERENCE TO RELATED APPLICATION

U.S. Ser. No. 705,923, filed July 16, 1976 Scheyhing et al, assigned to the assignee of the present application.

The present invention relates to a control system for automotive vehicles to maintain the speed of the vehicle at a predetermined level, and having a disconnect memory which can be set in a disconnect mode by predetermined disconnect signals and can be reset into a "resume" or SET mode by a "resume" signal.

BACKGROUND AND PRIOR ART

Automotive vehicle speed control systems must be capable of being immediately interrupted under certain operating conditions, for example upon operation of the brake, so that the speed control system does not tend to accelerate a vehicle if the operator wishes it to be slowed. Further, the system should not permit control of vehicle speed from a stopped or low-speed operating condition of the vehicle. Thus, the control system should be disabled below certain vehicle speeds. If the vehicle in which the control system is installed has a manually operated transmission, the control system should be disabled in the gear change interval to prevent excessive acceleration of the engine of the vehicle. Of course, it should also be possible to provide a manual disconnect switch.

The various conditions above referred to provide disconnect signals. A disconnect memory is provided so that, when one of the disconnect signals is effective, the control system will not be inadvertently enabled even by operation of a manual connecting switch.

The system should, additionally, be capable of interconnection with the remainder of the vehicle system, for example with the brake light switch, so that the system will be disabled if the brake light switch should become defective. Thus, if the actual vehicle speed differs from the commanded vehicle speed by a predetermined difference, control of the speed of the vehicle by the system should be inhibited. This last condition should, however, be capable of being overridden by a manually operated control switch, for example by a "resume" switch so that, after braking of the vehicle, the actually commanded speed can be reached automatically by the speed control system.

Control systems have previously been proposed in which the disconnect memory includes a relay having a switching contact connected in the current supply circuit of the positioning element for the engine, and which controls, for example, fuel supply thereto. The relay itself is controlled by the respective collector-emitter paths of various transistors, which in turn are controlled over appropriate threshold switches to which the various disconnect signals are applied. Upon conduction of the transistors, operation of the ON switch can energize the relay which is connected in a self-holding circuit for so long as current supply of the control element for the engine is closed. Operating the relay as connected requires a substantial number of components, which is expensive in costs as well as in assembly. Due to the relay, the system is subject to malfunction.

THE INVENTION

It is an object of the present invention to provide a vehicle speed control system having a disconnect memory which is so arranged that the number of components is reduced, while being reliable in operation and particularly meeting all safety requirements.

Briefly, the disconnect memory includes an amplifier which has a self-holding feedback circuit therein, the feedback circuit being controlled by the "resume" signal from a manually operable "resume" switch.

This system permits elimination of mechanically movable components, thus decreasing malfunction and increasing overall reliability. Due to the possibility of constructing the entire system or at least a substantial portion thereof as an integrated circuit, the space requirements for the structure are substantially reduced.

The control system can operate in analog, digital or hybrid form. If the control system uses disconnect signals which are present in analog form, then suitable threshold switches can be used to convert them into digital signals. These digital signals can then be applied to the input and/or the output of the amplifier in order to control the disconnect memory to change to blocking condition. In accordance with an advantageous feature of the invention, the number of components of the system can be additionally reduced and one threshold switch can be saved if the amplifier is constructed to be a difference amplifier, having a reference voltage applied to one terminal, the other terminal having an analog-type disconnect signal applied. The amplifier will then not only operate as an amplifier but additionally take over the function of a comparator and further that of a memory. In accordance with a preferred embodiment, a signal corresponding to actual speed is applied to the amplifier in analog form, and the reference voltage is so selected that the amplifier automatically changes to a "disconnect" state below a certain speed, for example about 25 km/h (about 15 mph).

The disconnect signal which is generated as a function of the difference between actual vehicle speed and commanded vehicle speed is applied to the amplifier in dynamic form. This is a particularly advantageous embodiment of the invention since, if the disconnect signal has controlled the memory to change to its blocking or disconnect mode, it can be reset to its "connect" or ON mode by manual operation of the "resume" switch, even if the actual speed is still less than the commanded or desired speed. Thus, under certain conditions, it is possible to permit the "resume" signal to supplant the disconnect signal.

Drawing, illustrating an example: the signal FIGURE is schematic diagram of the system.

An actual speed signal generator 10 provides a d-c signal at its output 11 which has an amplitude representative of vehicle speed. This speed signal is applied to a controller 13, operating as a comparator. The controller 13, for example an operational amplifier, additionally has a commanded speed signal applied thereto taken off the tap point of a potentiometer 12. The difference between command signal from potentiometer 12 and the actual speed signal from terminal 11 of speed signal generator 10 provides a positioning or error signal for positioning element 14. The positioning element includes a transistorized power stage 15 to control a magnetic valve 16 which is operatively connected to the throttle of the engine of the vehicle, together shown schematically by block 17.

The control system itself is shown only rudimentally and in general principle. Further details are disclosed in the cross-reference application Ser. No. 705,923, filed July 16, 1976, Scheyhing et al.

A disconnect memory and control circuit 20 includes the components to provide the disconnect signal, as well as the components which process a "resume" signal.

Various disconnect signals can be applied to the memory and control circuit 20. A first disconnect signal is taken off the output 18 of controller 13. This is an anolog disconnect signal and proportional to the difference between actual vehicle speed and commanded speed. This signal is applied to a threshold switch 21, at the output of which a negative voltage is provided if the actual speed of the vehicle is less than the commanded speed by a certain predetermined value. The output signal of threshold switch 21 is conducted over capacitor 22 and a decoupling diode 23 to a junction 24, which may be termed the OFF junction, to which disconnect signals are to be applied, junction 24 being connected to the memory and control circuit 20. An additional disconnect signal is derived from output 11 of speed signal generator 10 which is connected directly over a decoupling resistor 25 to the OFF junction 24 to provide a signal thereto if the speed of the vehicle is below a predetermined value.

A manual OFF switch 26 is connected to control a transistor 27 to become conductive so that, if closed, the conduction of transistor 27 will also drop the voltage level at junction 24 to approximately negative or ground level. The brake light switch 28 also provides a disconnect signal. If the brake light switch 28 or a connecting switch 29 are operated, a disconnect signal is provided. The coupling switch 29 is connected through a resistor 30 which has a value substantially higher than the resistance of the brake light (or brake lights, together represented by a single light) 31, so that, when the connecting switch 29 is closed but the brake light switch 28 is open, the base of transistor 27 is placed, approximately, at ground or chassis potential. If the connecting switch 29 remains closed but the brake light switch 28 is closed or if the connecting switch is opened, a positive voltage will be applied to the base of the transistor 27 so that it will become conductive and junction 24, effectively, will be placed at ground or chassis potential.

In summary: Operation of switches 26, 28, 29 provides positive voltage jumps which form disconnect signals which are inverted by the transistor 27 to form negative voltage pulses at the junction 24 to serve as disconnect signals. Negative voltage pulses to junction 24 are additionally directly applied under conditions: low vehicle speed, through resistor 25, or excessive difference between actual vehicle speed and commanded vehicle speed.

The memory and control circuit 20 includes a differential amplifier constructed as an operational amplifier 40 having inverting input 41 and direct input 42, and an output 43. Inverting input 41 of operational amplifier 40 is connected to the tap point of a voltage divider formed of resistors 44, 45. Switching diode 47 and resistor 46 form a feedback self-holding circuit. Switching diode 47 is so arranged in the feedback circuit that it is blocked if the "resume" switch 49 is closed to apply a positive pulse through diode 48 to the feedback circuit. Diodes 48 and 47 are reversely poled with respect to their common junctions.

Diode 50, connected to the output 43 of operational amplifier 40 blocks the power or end stage 15 if the output 43 of the operational amplifier is, effectively, at ground or chassis potential since the diode 50 is then conductive. If, however, the amplifier 40 switches over so that its output has approximately the voltage of the power supply 51 —shown as a battery — diode 50 will block and the power stage 15 can function as commanded by the output of comparator amplifier 13.

Operation: A negative voltage pulse at the OFF junction 24 causes a corresponding voltage drop at the direct input 42 of operational amplifier 40. Operational amplifier 40 will thus change state, and the output 43 will switch practically instantly to about chassis potential from an output level of about supply voltage, that is, in digital terminology, from a 1-signal to a 0-signal. This output voltage is fed back through resistor 46 and diode 47 to the direct input 42 so that, even after the OFF junction 24 no longer has a negative pulse appearing thereat, the operational amplifier 40 of the memory and control circuit 20 will remain in blocked condition, in which the output 43 is effectively at chassis potential, thus inhibiting control of the transistor 15. This affect is obtained by the positive feedback circuit 43-46-47-42. Closing the "resume" switch 49 does not change the condition of operational amplifier 40 if the OFF junction continues to have a voltage thereon which is less than the voltage determined by the voltage division ratio of the voltage divider formed by resistors 44, 45, and applied to the inverting input 41 of the operational amplifier 40. Due to the positive feedback, the operational amplifier 40 will continue to remain in its blocked state even if the OFF signal at OFF junction 24 has disappeared. If at that time, however, the "resume" switch 49 is operated, a "resume" signal will be generated, applied over diode 48 to inhibit self-holding of operational amplifier 40 by interrupting its feedback signal, and resetting operational amplifier 40 to provide its "high" output and hence the memory and control circuit 20 in its normal condition. The output 43 of the operational amplifier 40 will then again switch to almost supply voltage, so that diode 50 will block, and the power stage 15 can continue to control the valve actuator 16. Disconnect signals which occur only briefly may, for example, be generated by the brake light switch 28 when the brake is momentarily opened for temporary speed reduction; or, for example, during manual gear changes as sensed by the circuit, for example, by opening of connecting switch 29 or, for example, upon increase in speed of the vehicle beyond the minimum speed after having reached, for example, a downgrade.

The control system is characterized by the particularly simple construction of the memory and disconnect switch, which does not use relays which are subject to malfunction. The output 11 of the command speed signal generator 10 may, of course, also be connected over a threshold switch to provide a digital output signal which is then applied in digital form to the OFF junction 24. This increase in components can easily be avoided, however, if the reference voltage as applied by resistors 44, 45 to the operational amplifier is so selected that the operational amplifier additionally acts as a comparator with respect to the analog voltage of the OFF junction 24 and changes into its blocked condition if the analog signal applied from speed signal generator 10 to the OFF junction 24 through resistor 25 drops below the voltage applied to the inverting input 41 of the operational amplifier. Applying a disconnect signal to the OFF junction dynamically over capacitor 22 ensures that the differential speed OFF command can be supplanted by a "resume" signal, as desired in the usual operation of automotive vehicles.

Various changes and modifications may be made; for example, the disconnect signals applied to the OFF junction 24 could also be applied to the output 43 of the operational amplifier since resistor 46 and diode 47 feed back to the direct input approximately the voltage at the output 43 thereof.

We claim:

1. Vehicle speed control system comprising means (13) to generate a speed command signal;

control means (14, 15, 16) to control the engine of the vehicle in accordance with a speed control output signal;

a disconnect signal memory and control circuit (20) connected to control application of the speed control signal to the control means (114, 15, 16) and including an electronic amplifier (40) having a self-holding feedback connection (46, 47), an OFF junction (24) connected to the disconnect memory and control circuit (20) to set the circuit to a disconnect mode generating a disconnect signal and inhibit application of the speed control signal to the control means (14, 15, 16);

and a "resume" signal generating switch (49) connected to the self holding feedback connection (46, 47) of the amplifier (40) to disable application of the feedback signal from the output (43) of the amplifier to its input (42) and reset the amplifier to permit transfer of the speed control signal to the control means (14, 15, 16).

2. System according to claim 1, wherein the feedback circuit comprises a series connection including a resistor (46) and a switching diode (47);

and the resume switch (49) is connected to apply a signal to the switching diode (47) to block conduction thereof upon operation of the "resume" switch to disable the memory and control circuit (20).

3. System according to claim 1, wherein the OFF junction (24) has digital type signals applied thereto, said signals being connected to the amplifier (40) to affect its signal transfer.

4. System according to claim 3, wherein the connection between the OFF junction (24) and the amplifier (40) is directly to an input (42) of the amplifier (40).

5. System according to claim 3, wherein the connection from the OFF junction (24) to the amplifier (40) is through said feedback connection (46, 47).

6. System according to claim 1, wherein the amplifier comprises a differential amplifier, one input being connected to have the signals applied to the OFF junction (24) connected thereto, the other input being connected to a reference voltage;

and wherein one of said inputs comprises an analog value representative of an operating condition of the vehicle.

7. System according to claim 1, further comprising means (21) providing a "disconnect" signal to said OFF junction (24) when the difference between actual vehicle speed and commanded vehicle speed exceeds a predetermined value;

and a capacitor (22) connected between said difference generating means (21) and said OFF junction (24) to effect dynamic application of the disconnect signal representative of said difference to the OFF junction and permit supplanting of the disconnect signal from the memory and control circuit upon operation of the resume switch (49) even though the difference between actual and commanded speed above said predetermined value continues to persist.

8. System according to claim 1, further comprising switch means (26, 28, 29; 21, 22) applying digital OFF command signals to the OFF junction (24);

speed signal generating means (10) providing an analog speed signal to said OFF junction (24);

said amplifier (40) comprising an operational amplifier connected as a differential amplifier having one input thereof connected to a reference voltage, the other input being connected to said OFF junction having said digital type and said analog signals applied thereto, said operational amplifier responding to the digital type signals by suddenly changing its output at its output terminal (43) between two levels, and further suddenly changing its output if comparison of said analog signal with said reference drops below the reference level, to provide for the disconnect signal if the speed signal has dropped below a level representative of speed of the vehicle at which said system should not control vehicle operation.

* * * * *